United States Patent [19]

Kidani

[11] Patent Number: 4,712,948
[45] Date of Patent: Dec. 15, 1987

[54] BALL END MILL CUTTER

[76] Inventor: Morio Kidani, Kopo Tasaka 304, 8-14, Misasamachi 2-chome, Nishi-ku, Hiroshima-shi, Hiroshima-ken 730, Japan

[21] Appl. No.: 886,307

[22] Filed: Jul. 15, 1986

Related U.S. Application Data

[63] Continuation-in-part of Ser. No. 717,752, Mar. 29, 1985, abandoned.

[30] Foreign Application Priority Data

Mar. 31, 1984 [JP] Japan .................. 59-64217

[51] Int. Cl.$^4$ .................. B23C 5/02; B23C 5/10
[52] U.S. Cl. .................. 407/42; 407/54; 407/63; 408/230
[58] Field of Search .................. 407/42, 53, 54, 57, 407/62, 63; 408/230

[56] References Cited

U.S. PATENT DOCUMENTS

| | | | |
|---|---|---|---|
| 2,113,178 | 4/1938 | Gase | 407/63 |
| 2,413,989 | 1/1947 | Molner et al. | 407/63 |
| 3,409,965 | 11/1968 | Fisher | 407/63 |
| 3,696,484 | 10/1972 | Spriggs | 407/42 |

FOREIGN PATENT DOCUMENTS

| | | | |
|---|---|---|---|
| 27107 | 5/1920 | Denmark | 407/63 |
| 42760 | 3/1980 | Japan | 407/63 |
| 608745 | 9/1948 | United Kingdom | 408/230 |
| 852461 | 8/1981 | U.S.S.R. | 407/54 |

Primary Examiner—Nicholas P. Godici
Assistant Examiner—Jerry Kearns
Attorney, Agent, or Firm—Flynn, Thiel, Boutell & Tanis

[57] ABSTRACT

A ball end mill cutter comprises a mill body and a shank portion. The mill body comprises a tapered or non-tapered reference cylindrical surface, a reference semi-spherical surface on the end of the latter and cutting edges continuing between the reference cylindrical and semi-spherical surfaces. A random point on the cutting edges on the reference semi-spherical surface is expressed:

When a reference latitudinal plane defines the junction of the reference cylindrical and semi-spherical surfaces, a Serial reference longitudinal (meridian) plane intersects the reference latitudinal plane; a latitudinal angle $\gamma$ lies between the reference latitudinal plane and a radius line drawn to the reference semi-spherical surface; a helical angle $\alpha$ lies between a tangential line of a helical cutting edge and the reference longitudinal plane; a longitudinal angle $\beta$ lies between a longitudinal plane, connecting the central axis of the cutter to a random point of the tip of helical cutting edge on the reference semi-spherical surface, and the reference longitudinal plane; $\alpha p$ is a random value of a latitudinal angle in the range of 65° to 90°; $F(\alpha)$ is a function producing a desired smooth line with respect to the latitudinal angle $\alpha$; and $F'(\alpha)$ is a differential of the function $F(\alpha)$; then in the range $0 \leq \alpha \leq \alpha p$ $$\beta = \tan\gamma \cdot F(\alpha)$$

$F'(0) = 1$
$F'(\alpha p) = 0$ or a positive value approaching 0,
and in the range $\alpha p \leq \alpha < 90°$
$F'(\alpha) = 0$ or a positive value approaching 0.

3 Claims, 14 Drawing Figures

Fig. 1
Fig. 2
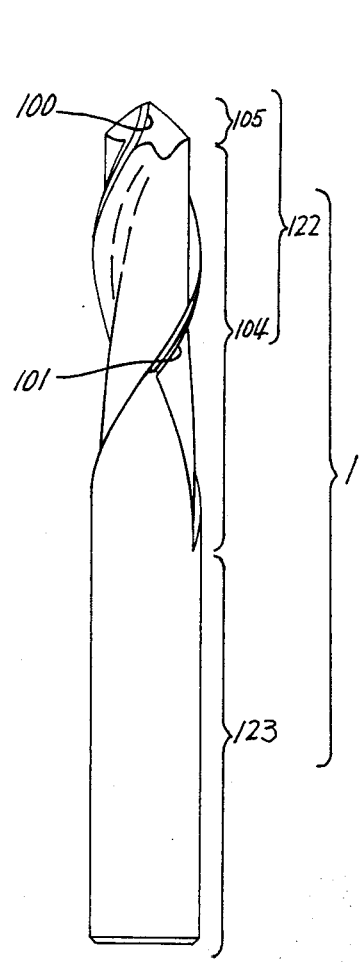
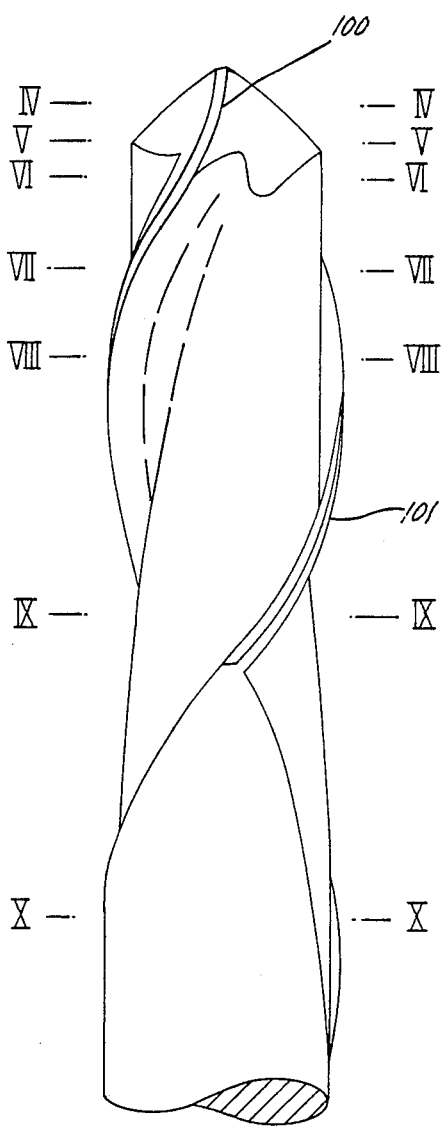

BALL END MILL CUTTER

This application is a continuation-in-part of copending U.S. application Ser. No. 717752 filed Mar. 29, 1985, and now abandoned, entitled "BALL END MILL WITH PLAIN OR TAPERED HELICAL CUTTER TEETH HAVING A LARGE HELICAL ANGLE AND A LARGE RAKE ANGLE", of the present inventor.

BACKGROUND OF THE INVENTION

A profile milling machine has a copying structure provided with a contact rod having a semi-spherical surface at the tip end of the contact rod. A tip end of an end mill cutter is likewise formed in a semi-spherical surface having the same radius and with high accuracy. Thus, it was hitherto impossible to manufacture a product with high accuracy.

It is an object of the present invention to provide a ball end mill cutter capable of manufacturing a workpiece adapted to mass-production with small size and extremely high accuracy.

A conventional ball end mill cutter will not be manufactured in a small size compared with that having a blade integrally mounted with a body.

Another ball end mill cutter having a blade integrally mounted with a body is well known. A cutting edge thereof is not smoothly provided at a junction portion of a cylindrical body and a semi-spherical blade mounted on the body. When a workpiece is cut with use of this ball end mill cutter, there remains a trace of the junction portion on the workpiece, thereby causing the workpiece to be inferiorly finished and making it difficult to proceed to the next manufacturing step so that it takes time and labor to manufacture the workpiece and manufacture is only with limited accuracy.

SUMMARY OF THE INVENTION

The ball end mill cutter is composed of a mill body and a shank portion. The mill body comprises a tapered or non-tapered reference cylindrical surface and a reference semi-spherical surface mounted on a tip end of the reference cylindrical surface and a plurality of cutting edges continuously provided between cylindrical surface and the reference semi-spherical surface. A random point of the cutting edges on the reference semi-spherical surface is expressed as follows:

When a reference latitudinal plane is taken as a junction surface of the reference cylindrical surface with the reference semi-spherical surface; a plane, corresponding to a meridian plane with respect to the reference semi-spherical surface, is taken as a reference longitudinal plane intersecting with the reference latitudinal plane; an angle between the reference latitudinal plane and a radius line of the sphere drawn to the reference semi-spherical surface (which radius line extends from the central point at which the reference latitudinal plane intersects with a central axis of the ball end mill cutter) is taken as a latitudinal angle $\alpha$; an angle of a tangential line of a helical cutting tooth with respect to the reference longitudinal plane (which tangential line passes through a point at the intersection of the cutting edge line of the cutting tooth with the reference latitudinal plane) is taken as a helical angle $\gamma$; an angle of a longitudinal plane (namely the longitudinal plane connecting the central axis of the ball end mill cutter to a random point of the tip of helical cutting tooth on the reference semi-spherical surface) with respect to the reference longitudinal plane is taken as a helical cutting tooth longitudinal angle $\beta$; a random value of a latitudinal angle in the range of 65° to 90° is taken as $\alpha p$; a function producing a desired smooth line with respect to the latitudinal angle $\alpha$ is taken as $F(\alpha)$; and a differential of the function $F(\alpha)$ is taken as $F'(\alpha)$; then in the range of $0 \leq \alpha \leq \alpha p$ $$\beta = \tan \gamma \cdot F(\alpha)$$

$F'(0) = 1$ $F'(\alpha p) = 0$ or a positive value approaching 0 (is not negative), and in the range of $\alpha p \leq \alpha < 90°$ $F'(\alpha) = 0$ or a positive value approaching 0 (is not negative).

BRIEF DESCRIPTION OF THE DRAWINGS

FIG. 1 is a front elevational view of a ball end mill cutter according to the present invention;

FIG. 2 is a front elevational view with a part thereof being enlarged;

DETAILED DESCRIPTION OF PREFERRED EMBODIMENTS

A desired point is specified based on a latitude and longitude of the earth. References of latitude and longitude respectively correspond to an equator plane and a meridian plane passing Greenwich.

Figure 13:
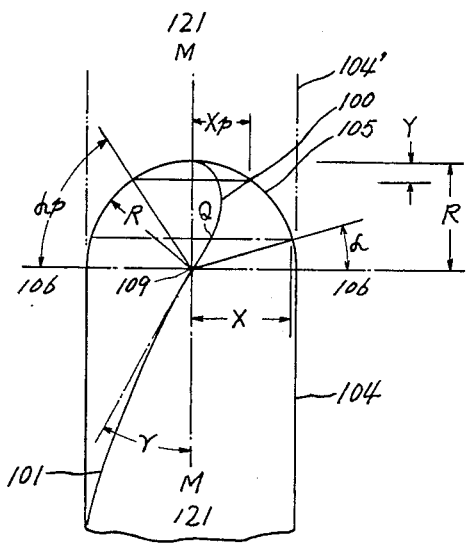
FIG. 13 is an enlarged side elevational view illustrating a principle employed in the present invention.
Figure 14:
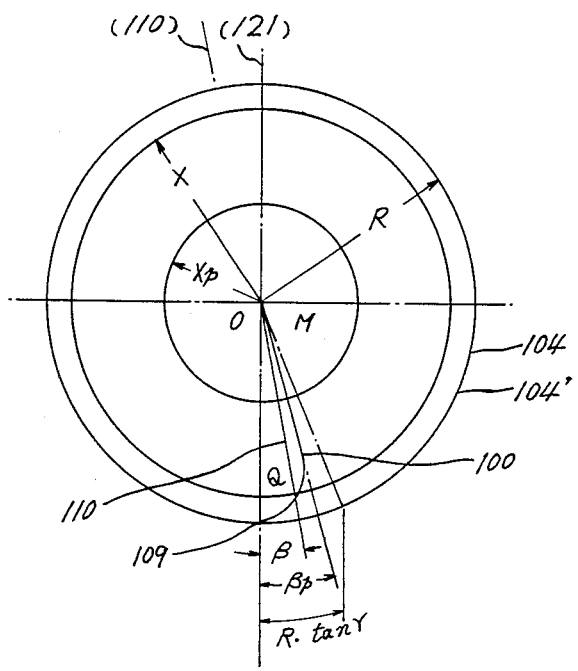
FIG. 14 is an enlarged plan view illustrating a principle employed in the present invention.

Attention is directed to FIGS. 13 and 14. Designated at 106 is a reference latitudinal plane which corresponds to the equator plane and which is a junction surface of a reference cylindrical surface 104 of an end mill cutter 1 with a reference semi-spherical surface 105 of the end mill cutter 1. A reference longitudinal plane 121 corresponds to the meridian plane and passes through a point 109 where the tip end of each of a pair of cutting edges 101, 100 of the end mill cutter 1 intersects with the reference longitudinal plane 106. Designated at 104' is an ideal cylindrical surface surrounding the reference semi-spherical surface 105.

Figure 3:
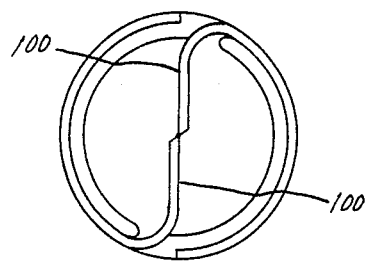
FIG. 3 is a plan view of FIG. 1.
Figure 6:
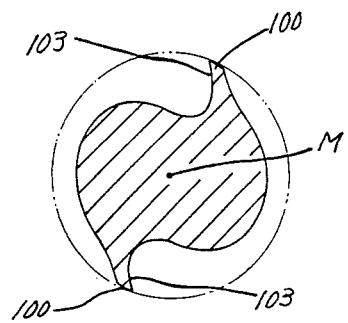
FIGS. 4 to 10 are respectively cross sectional side elevational views taken along lines IV—IV to X—X of FIG. 2.
Figure 4:
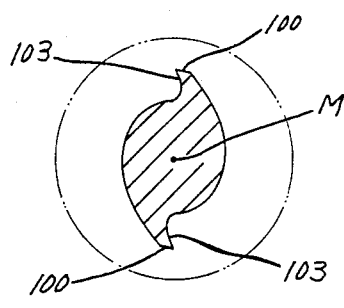
Figure 7:
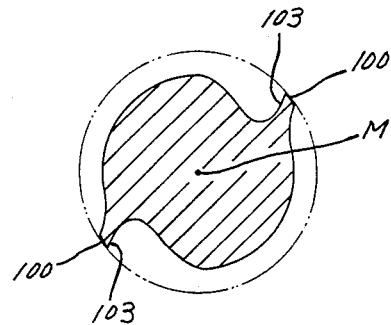
Figure 5:
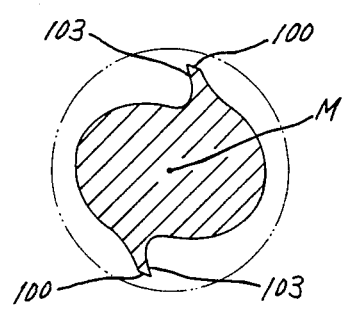
Figure 8:
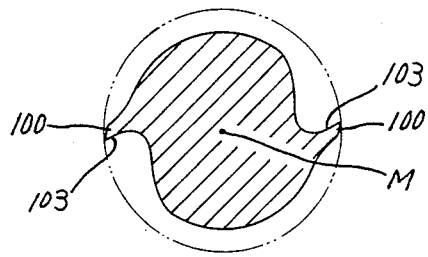
Figure 9:
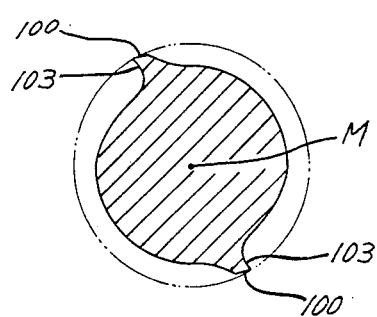
Figure 10:
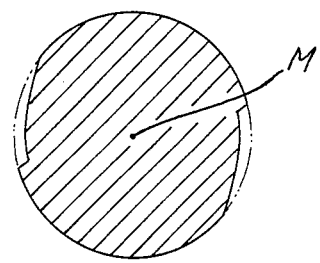
Figures 11, 12:
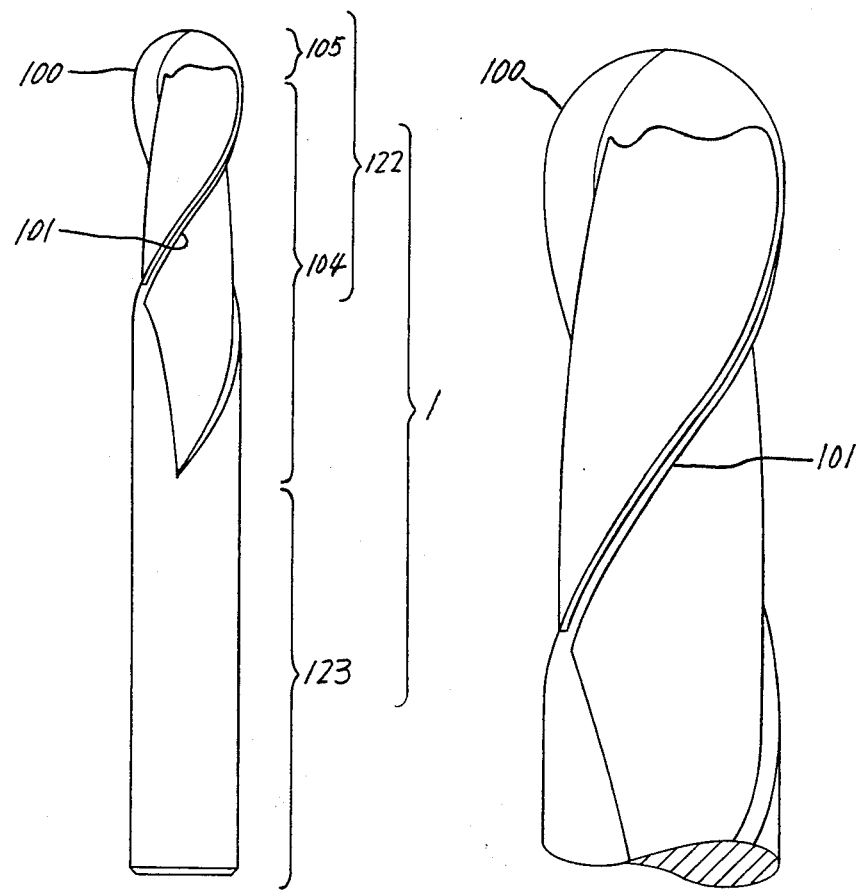
FIG. 11 is a side elevational view of FIG. 1.
FIG. 12 is a side elevational view of FIG. 1 with a part being enlarged.

The ball end mill cutter 1 comprises a mill body 122 and a shank portion 123 (FIG. 11). The mill body 122 comprises the reference cylindrical surface 104 (which may be tapered or nontapered) and the reference semi-spherical surface 105 (which is mounted on a tip end of the reference cylindrical surface 104) and the cutting edges 101 and 100 (which are continuously provided along the reference cylindrical surface 104 and the reference semi-spherical surface 105).

Returning to FIGS. 13 and 14, R is a radius line of the sphere which is drawn to the reference semi-spherical surface 105 from a central point O. This central point O is the intersection of the reference latitudinal plane 106 by a central axis M of the ball end mill cutter 1. $\alpha$ is a latitudinal angle between the radius line R, and the reference latitudinal plane 106. γ is a helical angle between the tangential line of a helical cutting tooth 101 and the reference longitudinal plane 121 (which tangential line passes the point 109 of intersection of the cutting edge line of the cutting tooth 101 with the reference latitudinal plane 106). β is a helical cutting tooth longitudinal angle between the longitudinal plane 110 (which connects the central axis M of the ball end mill cutter 1 with a random point Q of the tip of helical cutting tooth 100 on the reference semi-spherical surface 105) and the reference longitudinal plane 121. αp is a random value of the latitudinal angle α in the range of 65° to 90°. F(α) is a function producing a desired smooth line with respect to the latitudinal angle α. F'(α) is a differential of the function F(α). The ball end mill cutter is structured as shown in the following equation.

In the range of $0 \leq \alpha \geq \alpha p$, $$\beta = \tan \gamma \cdot F(\alpha),$$

$F'(0) = 1,$ $F'(\alpha p) = $ a positive value approaching 0 (is not negative), and in the range of $\alpha p \leq \alpha < 90°$ $F'(\alpha) = $ a positive value approaching 0 (is not negative).

A face 103 at a random point Q on the cutting tooth 100 over the reference semi-spherical surface 105 is formed in the manner that the radius line drawn in the direction from the random point Q to the central axis M is hollowed out. Therefore, with reducing of the radius X of the cutting edge, it is not possible to assure a space to define the face 103. When the latitudinal angle corresponds to the radius X of certain cutting edge, the different cutting edge line 100 may be provided continuously and smoothly over the reference semi-spherical surface 105 between $0 \leq \alpha \leq \alpha p$ and $\alpha p \leq \alpha < 90°$.

When the cutting edge line 101 on the reference cylindrical surface 104 is elongated to the ideal cylindrical surface 104' to provide an extension cutting edge line 101' and the extension cutting edge line 101' is raised to the height R in the direction of central axis M, the cutting edge is moved to R·tan γ in the direction of a circumference of the ideal cylindrical surface 104'. Thus, it is impossible to design and manufacture the ball end mill cutter with the conventional structure since the helical cutting edge on the spherical surface is inserted into a concave portion of the face of the cylindrical surface helical cutting tooth so that the longitudinal angle β is smaller in the extent to avoid the hollowed out portion of the face than R·tan γ. According to the present invention, it is possible to design and manufacture a ball end mill cutter in which the cutting edge avoids the hollowed out portion of the face very simply by selecting a shape to be expressed by the function F(α). Furthermore, the helical cutting tooth 101 of the reference cylindrical surface 104 and the cutting tooth 100 of the reference semi-spherical surface 105 are smoothly continuing at the reference intersecting point 109. The cutting edge curved line is gradually changed depending on the latitudinal angle α. A curved line showing the change is expressed as a equation f(α). The following relation is produced between the latitudinal angle α and the helical longitudinal angle β.

$$\beta = K \cdot \tan \gamma \cdot f(\alpha)$$

where K is a proportionality constant. When this equation is substituted with K·f(α) = F(α), the helical cutting tooth longitudinal angle β is expressed $$\beta = \tan \gamma \cdot F(\alpha).$$

Experimentally, when a slope of F(α) is 45° at α = 0, namely, F'(α) = 1, the helical cutting tooth 101 of the reference cylindrical surface 104 is smoothly continued into the helical cutting tooth 100 of the reference semi-spherical surface 105. This is achieved because the cutting edge is slantingly upwardly directed at the reference intersecting point 109.

When a slope of F(α) is 0 at α = αp, namely, the differential F'(α) of F(α) = 0, a connection of the cutting edge 100 is directed to the radius.

When a slope of F(α) = 0 or approximates zero and is not negative in the range of αp < α < 90°, the cutting edge is provided directing to the central axis M.

It is impossible to provide a large rake surface since a height Y (FIG. 13) extending to the tip end of the spherical surface 105 is quite small, and the amount of cut portion of the workpiece is also small in the range of αp < α < 90° to maintain the strength of the tip end. When αp = 65°, the height Y is expressed as follows.

$$Y = R - R \sin 65° = R(1 - 0.9063) = 0.0935R \doteq 0.1R$$

Further, radius X is expressed as follows.

$$X = R - R \cos 65° = R(1 - 0.4067) = 0.5933R \doteq 0.6R$$

In this case, the relative rake surface is well enough since the rotating peripheral velocity is slow and the amount of cut portion of the workpiece is small.

As mentioned above, the following features are achieved according to the present invention.

First, the invention makes it possible to manufacture a workpiece adapted to a mass-production with small size and extremely high accuracy.

Secondly, the invention makes it possible to design and manufacture the ball end mill cutter in which the cutting edge avoids the hollowed out portion of the face very simply by selecting a shape to be expressed by the function F(α).

I claim:

1. A ball end mill cutter comprising a central axis and a mill body and a shank portion distributed along said central axis, said mill body comprising a generally cylindrical surface and a reference semi-spherical surface mounted on a tip end of said reference cylindrical surface and a plurality of helical cutting edges continuously provided between said cylindrical surface and the reference semi-spherical surface, a random point of said cutting edges on said reference semi-spherical surface being expressed as:

when a reference latitudinal plane is taken as a junction surface of the reference cylindrical surface with the reference semi-spherical surface;

a plane corresponding to a meridian plane with respect to the reference semi-spherical surface is taken as a reference longitudinal plane intersecting with the reference latitudinal plane;

an angle between the reference latitudinal plane and a radius line of the sphere drawn to the reference semi-spherical surface (which radius line extends from a central point at which the reference latitudinal plane intersects with the central axis of the ball end mill cutter) is taken as a latitudinal angle $\alpha$;

an angle of a line tangent to a said helical cutting edge with respect to the reference longitudinal plane (which tangential line passes through a point at the intersection of the cutting edge line of the cutting edge with the reference latitudinal plane) is taken as a helical angle $\gamma$;

an angle of a longitudinal plane (namely the longitudinal plane connecting the central axis of the ball end mill cutter to a random point of the tip of helical cutting edge on the reference semi-spherical surface) with respect to the reference longitudinal plane is taken as a helical cutting edge longitudinal angle $\beta$;

a random value of a latitudinal angle $\alpha$ in the range of 65° to 90° is taken as $\alpha p$;

a function producing a desired smooth line with respect to the latitudinal angle is taken as $F(\alpha)$; and a differential of the function $F(\alpha)$ is taken as $F'(\alpha)$; then in the range of $0 \leq \alpha \leq \alpha p$ $$\beta = \tan \gamma \cdot F(\alpha)$$

$F'(0) = 1$
$F'(\alpha p) = 0$ or a positive value approaching 0, and in the range of $\alpha p \leq \alpha < 90°$
$F'(\alpha) = 0$ or a positive value approaching 0.

2. The apparatus of claim 1 in which said generally cylindrical surface is somewhat tapered.

3. The apparatus of claim 1 in which said generally cylindrical surface is nontapered.

* * * * *